US007985939B2

(12) United States Patent
Gillet et al.

(10) Patent No.: US 7,985,939 B2
(45) Date of Patent: Jul. 26, 2011

(54) METHOD OF SORTING POSTAL ITEMS IN FLIP/FLOP MODE

(75) Inventors: François Gillet, Lyons (FR); Guy Forella, Saint Peray (FR)

(73) Assignee: Solystic, Gentilly Cedex (FR)

( * ) Notice: Subject to any disclaimer, the term of this patent is extended or adjusted under 35 U.S.C. 154(b) by 486 days.

(21) Appl. No.: 12/090,155

(22) PCT Filed: Jan. 31, 2008

(86) PCT No.: PCT/FR2008/050157

§ 371 (c)(1),
(2), (4) Date: May 2, 2008

(87) PCT Pub. No.: WO2008/113923

PCT Pub. Date: Sep. 25, 2008

(65) Prior Publication Data

US 2009/0101548 A1 Apr. 23, 2009

(30) Foreign Application Priority Data

Mar. 16, 2007 (FR) ...................................... 07 53893

(51) Int. Cl.
*G06K 9/00* (2006.01)

(52) U.S. Cl. ......................... 209/584; 209/552; 209/900

(58) Field of Classification Search .................. 209/552, 209/584, 900
See application file for complete search history.

(56) References Cited

U.S. PATENT DOCUMENTS 5,353,903 A * 10/1994 Kechel et al. ..................... 193/3
5,893,464 A * 4/1999 Kiani et al. ................... 209/584
2005/0252836 A1 11/2005 Burns et al.
2005/0279674 A1 * 12/2005 Gillet ........................... 209/584

FOREIGN PATENT DOCUMENTS

WO WO 2006/020750 A 2/2006

* cited by examiner

*Primary Examiner* — Terrell H Matthews

(74) *Attorney, Agent, or Firm* — Rothwell, Figg, Ernst & Manbeck, P.C.

(57) ABSTRACT

A method of sorting postal items for preparing postman's walks on a postal sorting machine having an inlet and a set of sorting outlets includes loading a first batch of postal items and a second batch of postal items consecutively into the inlet of the machine, and directing the postal items of the first batch towards a first subset of sorting outlets, and the postal items of the second batch of postal items towards a second subset of sorting outlets that is separate from the first subset of sorting outlets; and while the postal items of the second batch of postal items are being directed towards the second subset of sorting outlets, reloading the inlet of the machine with the postal items taken from the first subset of sorting outlets, and, while the postal items of the first batch of postal items are being directed towards the first subset of sorting outlets, reloading the inlet of the machine with the postal items taken from the second subset of sorting outlets.

7 Claims, 1 Drawing Sheet

Fig. 1
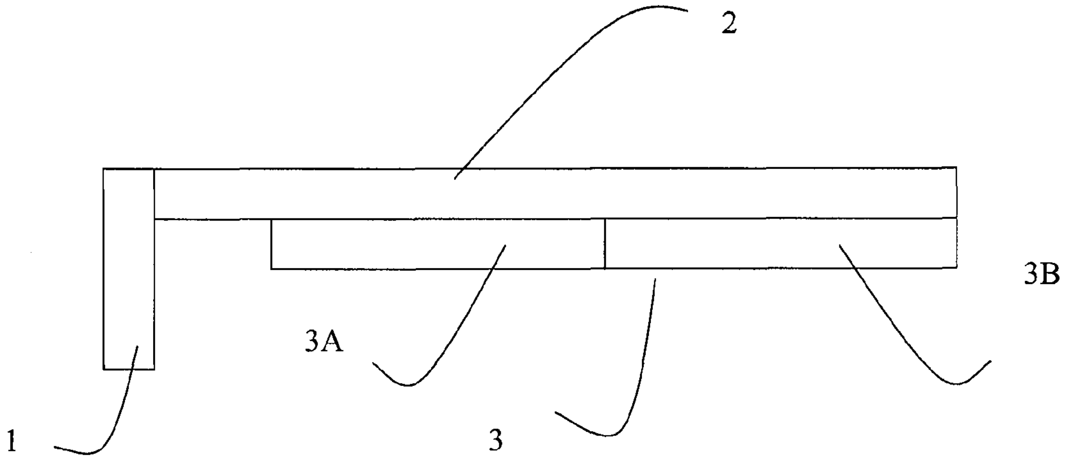
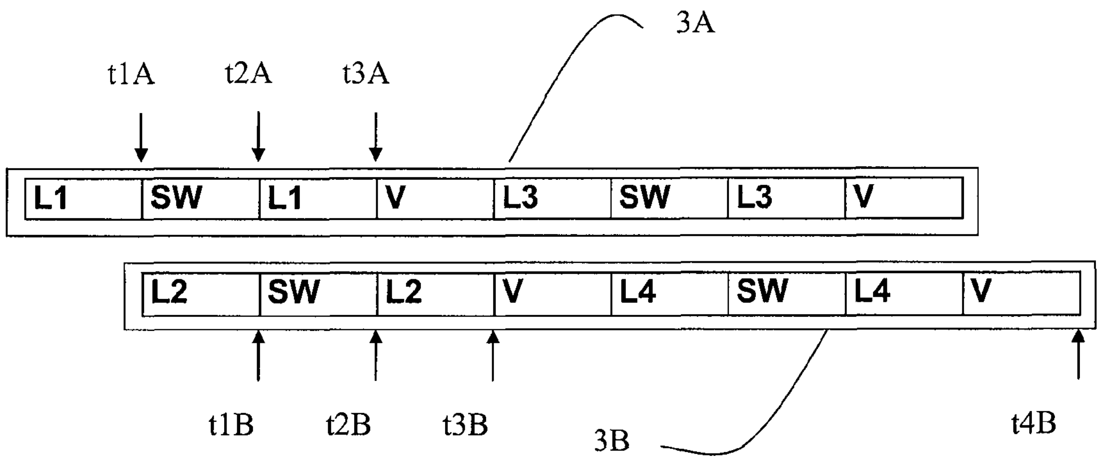
Fig. 2

METHOD OF SORTING POSTAL ITEMS IN FLIP/FLOP MODE

CROSS REFERENCE TO RELATED APPLICATIONS

This application is a 35 U.S.C. §371 National Phase Application from PCT/FR2008/050157, filed Jan. 31, 2008, and designating the United States, which claims the benefit of France Patent Application No. 0753893, filed Mar. 16, 2007.

BACKGROUND OF THE INVENTION

I. Field of the Invention

The present invention relates to a method of sorting postal items with a view to preparing delivery rounds or "postman's walks", such postal items being particularly but not exclusively postal items of small format, of the letter type, on a postal sorting machine having one inlet and a certain number of sorting outlets, e.g. the postal sorting machine known by the name of "Star-Duplex" from the supplier "Solystic".

II. Discussion of the Background Art

Postman's walks with small-format postal items are currently mainly prepared on two types of equipment. A first type of equipment is constituted by very compact postal sorting machines typically having 20 sorting outlets and capable of preparing postman's walks in 3 sorting passes. Those machines are generally installed in delivery or "inward sorting" post offices.

The second type of equipment is constituted by postal machines that are installed in postal sorting centers and that have several hundred sorting outlets so as to be capable of preparing postman's walks in only 2 sorting passes.

The above-indicated postal sorting machine belongs to the second type of sorting machine. With that postal sorting machine, 40 postman's walks can be prepared simultaneously in two sorting passes, given that that machine can process about 40,000 postal items per hour from one inlet and can manage about 300 sorting outlets, and that a postman's walk can comprise up to 1000 postal items to be spread over up to 600 delivery points.

A machine of the second type makes it possible to prepare simultaneously a much larger number of postman's walks than is possible with a machine of the first type.

It is recalled that the number of delivery points in a postman's walk that can be sequenced in 2 sorting passes with a sorting machine equipped with S sorting outlets is equal to $S^2$. In addition, after a first sorting pass, the postal items are taken from the sorting outlets and put into bins, the bins are brought in a certain order back towards the inlet of the machine, and, finally, the postal items are re-inserted into the inlet of the machine for a second pass through the machine (second sorting pass) resulting in the postal items being sequenced in the various different postman's walks.

Generally, the bins are transferred manually from the sorting outlets to the inlet of the machine. Handling the bins for returning the postal items to the inlet of the machine can take a relatively long time, during which time the sorting machine is stopped. The time required for handling a bin for returning the postal items can be estimated to be about 12 seconds, which, in view of the total number of sorting outlets, can represent several hours of bin handling time over one cycle for preparing a plurality of postman's walks on the machine. Such bin handling also requires several machine operators to be present. Such machine down times and bin handling times during which the bins are being handled by operators give rise to additional costs for preparing a postman's walk, and they delay delivery of the mail.

SUMMARY OF THE INVENTION

An object of the invention is to propose a sorting method that makes it possible to procure a significant reduction in the cost of preparing a postman's walk, for the same machine operating constraints.

To this end, the invention provides a method of sorting postal items for preparing postman's walks on a postal sorting machine having an inlet and a set of sorting outlets, said method comprising the following steps:

- loading a first batch of postal items and a second batch of postal items consecutively into the inlet of the machine, and directing the postal items of the first batch towards a first subset of sorting outlets, and the postal items of the second batch of postal items towards a second subset of sorting outlets that is separate from the first subset of sorting outlets; and
- while the postal items of the second batch of postal items are being directed towards the second subset of sorting outlets, reloading the inlet of the machine with the postal items taken from the first subset of sorting outlets, and, while the postal items of the first batch of postal items are being directed towards the first subset of sorting outlets, re-loading the inlet of the machine with the postal items taken from the second subset of sorting outlets.

In accordance with the invention, the sorting machine is caused to operate in an "alternating" or "flip/flop" mode, i.e. the entire set of sorting outlets of the machine is substantially split into two halves so as to form two separate subsets of sorting outlets that operate alternately in loading mode and in unloading mode without interrupting the sorting process. The advantage resulting from the two subsets of sorting outlets operating in alternation is that the sorting machine is not stopped while the postal items are being returned to the inlet of the machine, and it can readily be understood that the machine operates optimally when the time required for returning the postal items of one sorting pass is equal to the time required for sorting the postal items of another sorting pass.

It is possible to use separators for separating the batches of postal items inserted successively into the machine.

Overall, with a method of the prior art on a "Star-Duplex" machine, it has been measured that about 2.21 hours are necessary with 2 operators in order to prepare 40 postman's walks simultaneously, i.e. the annual cost is about 33,500 euros. With the method of the invention, the time required for preparing 40 postman's walks is about 2.05 hours, for an annual cost of about 31,100 euros, also with 2 operators.

BRIEF DESCRIPTION OF THE DRAWINGS

Other characteristics and advantages can be better understood on reading the description given with reference to the accompanying drawing, in which:

FIG. 1 is a highly diagrammatic view of a postal sorting machine with two subsets of sorting outlets; and FIG. 2 is a timing diagram showing how the sorting steps and the sorting outlet emptying steps follow on from one another in the method of the invention.

DETAILED DESCRIPTION OF THE PREFERRED EMBODIMENTS

FIG. 1 shows a postal sorting machine provided with an inlet 1 for feeding postal items disposed in series and on edge into a postal item sorting device 2 which, by recognizing the postal address on the surface of each postal item, directs said postal item towards a determined sorting outlet from among a set 3 of sorting outlets.

More specifically in accordance with the invention, the set 3 of sorting outlets is substantially split into two halves, namely a first subset 3A of sorting outlets and a second subset 3B of sorting outlets, the two subsets of sorting outlets operating alternately in filling mode and in emptying mode.

By way of example, with a machine of the "Star-Duplex" type, it is possible to have 76 useful sorting outlets (not counting the outlets used for rejects) per subset of sorting outlets, thereby making it possible, in 2 sorting passes, to prepare about 10 postman's walks per subset of sorting outlets, each postman's walk comprising up to 1000 postal items spread over up to 600 delivery points. In this example, it is therefore possible for 10,000 postal items in one batch to be inserted into the machine for the purpose of being sequenced as a function of the delivery points of 10 postman's walks, assuming that the storage capacity of each sorting outlet is at least 130 postal items.

FIG. 2 is a highly diagrammatic view showing the chronological order of the steps of the method of the invention in a simple case when 4 batches of postal items are loaded successively into the inlet of the machine for the purpose of preparing 40 postman's walks, each of which has 1000 postal items (these values being given merely by way of example).

A batch of first postal items L1 is firstly loaded into the inlet of the sorting machine, and the first mail items are thus directed (sorted) to the outlets of the first subset of sorting outlets 3A during a first sorting pass.

Another batch of second postal items L2 is loaded into the inlet of the sorting machine after the postal items of the first batch L1.

At instant t1A, at the end of the first sorting pass for sorting the first postal items, said first postal items are returned to the inlet of the sorting machine behind the postal items of the second batch. This return step is symbolized by SW, and, at instant t2A, the returned first postal items are sorted again (second sorting pass), so as to be directed towards the sorting outlets of the subset of sorting outlets 3A.

Simultaneously with the return operation SW being performed on the first postal items at instant t1A, the second postal items are being sorted so as to be directed towards the sorting outlets of the second subset of sorting outlets 3B.

At instant t1B, at the end of the first sorting pass for sorting the second postal items, said second postal items are returned to the inlet of the sorting machine behind the first returned postal items. This return operation for returning the second postal items is also symbolized by SW, and, at instant t2B, the returned second postal items are sorted again (second sorting pass) so as to be directed towards the sorting outlets of the sorting subset 3B.

At the end of the second sorting pass for sorting the first postal items (at instant t3A), the first postal items are sequenced in delivery point order for the first ten postman's walks, and they are removed from the sorting outlets. This removal operation is symbolized by V.

At the same time, a batch of third postal items L3 is loaded into the inlet of the machine after the second postal items that have just been returned. At the end of the second pass for sorting the second postal items (at instant t3B), the second postal items are in turn removed from the sorting outlets, this removal being symbolized by V. At the same time, a batch of fourth postal items L4 is loaded into the inlet of the machine after the third postal items.

The operations of sorting, of returning, and of emptying in alternation as performed on the subsets of sorting outlets 3A and 3B are repeated for the batches of postal items L3 and L4, as indicated above for the batches of postal items L1 and L2.

At the end of the operation of removing the fourth postal items (at instant t4B), 40 postman's walks have been prepared without interrupting operation of the sorting machine. Only two operators are necessary for achieving this preparation of the postman's walks, one for loading the inlet of the sorting machine, and the other for returning the postal items to the inlet of the machine.

In general, the time necessary for returning the postal items (time of an operation SW) is greater than the time necessary for performing a sorting pass on a subset of sorting outlets, but it is possible to achieve an optimum configuration for the machine whereby the lengths of these two periods are brought closer to each other, as a function of the number of sorting outlets of the machine, of the number of postman's walks to be prepared simultaneously on the machine, and of the storage capacity of each sorting outlet. It is also possible to minimize the operating cost of the machine by appropriately dimensioning said machine in terms of number of sorting outlets Nbst per outlet subset, which dimensioning is given by the formula: $Nbst=\sqrt{dpi}\times 1/\sqrt{2}$, where dpi is the total number of delivery points in all of the postman's walks to be sequenced on the machine in two passes. In this optimized "flip/flop" mode, the time necessary for preparing 40 postman's walks is about 1.65 hours for an annual cost of 25,000 euros.

For implementing the method of the invention, the two subsets of sorting outlets 3A, 3B can be disposed one behind the other in line with the sorting outlets, or they can be disposed one alongside and parallel to the other (when the machine has a U-shaped design), or indeed they can be disposed one above the other (in the vertical direction) when the machine has stepped outlets.

The invention claimed is:

1. A method of sorting postal items for preparing postman's walks on a postal sorting machine having an inlet and a set of sorting outlets, said method comprising the steps of:

loading a first batch of postal items and a second batch of postal items consecutively into the inlet of the machine, and directing the postal items of the first batch towards a first subset of sorting outlets, and the postal items of the second batch of postal items towards a second subset of sorting outlets that is separate from the first subset of sorting outlets; and while the postal items of the second batch of postal items are being directed towards the second subset of sorting outlets, reloading the inlet of the machine with the postal items taken from the first subset of sorting outlets, and, while the postal items of the first batch of postal items are being directed towards the first subset of sorting outlets, re-loading the inlet of the machine with the postal items taken from the second subset of sorting outlets; wherein the sorting machine is dimensioned with a number of sorting outlets Nbst per subset of sorting outlets that is defined by the following relationship:

$$Nbst=\sqrt{dpi}\times 1/\sqrt{2}$$

where dpi is the total number of delivery points of all of the postman's walks to be sequenced on the machine in two sorting passes.

2. A method according to claim 1, wherein the inlet of the machine is reloaded with the postal items taken from the first subset of sorting outlets during a first sorting pass for sorting the postal items of the second batch of postal items, and the inlet of the machine is re-loaded with the postal items taken from the second subset of sorting outlets during a second sorting pass for sorting the postal items of the first batch of postal items.

3. A method according to claim 1, wherein the two subsets of sorting outlets have the same number of sorting outlets.

4. A method according to claim 1, wherein each batch of postal items includes postal items of a plurality of postman's walks.

5. A method according to claim 1, wherein the two subsets of sorting outlets are disposed one after the other in a certain longitudinal direction.

6. A method according to claim 1, wherein the two subsets of sorting outlets are disposed alongside and parallel to each other.

7. A method according to claim 1, wherein the two subsets of sorting outlets are disposed one above the other.

* * * * *